US012743268B2

(12) United States Patent
Guan et al.

(10) Patent No.: US 12,743,268 B2
(45) Date of Patent: Sep. 22, 2026

(54) UPDATING RUNNING CONTAINERS WITHOUT REBUILDING CONTAINER IMAGES

(71) Applicant: International Business Machines Corporation, Armonk, NY (US)

(72) Inventors: Zhi Li Guan, Beijing (CN); Peng Hui Jiang, Beijing (CN); Jun Su, Beijing (CN); Kun Yang, Beijing (CN); Cheng Wu, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 469 days.

(21) Appl. No.: 18/065,738

(22) Filed: Dec. 14, 2022

(65) Prior Publication Data

US 2024/0201979 A1 Jun. 20, 2024

(51) Int. Cl.

| | |
|---|---|
| ***G06F 8/65*** | (2018.01) |
| ***G06F 8/656*** | (2018.01) |
| ***G06F 16/11*** | (2019.01) |

(52) U.S. Cl.

CPC ............ *G06F 8/656* (2018.02); *G06F 16/128* (2019.01)

(58) Field of Classification Search

CPC ........................................................ G06F 8/60

See application file for complete search history.

(56) References Cited

U.S. PATENT DOCUMENTS

| | | | | |
|---|---|---|---|---|
| 2016/0274928 | A1* | 9/2016 | Linton | G06F 9/45558 |
| 2016/0359955 | A1* | 12/2016 | Gill | H04L 67/10 |
| 2019/0114164 | A1 | 4/2019 | Wong et al. | |
| 2019/0235897 | A1 | 8/2019 | Goel | |
| 2019/0339901 | A1* | 11/2019 | Ou-Yang | G06F 3/0617 |
| 2021/0042141 | A1 | 2/2021 | De Marco et al. | |
| 2021/0286640 | A1* | 9/2021 | Zengerle | G06F 16/1734 |
| 2023/0096024 | A1* | 3/2023 | Yeung | G06F 21/577 726/25 |

FOREIGN PATENT DOCUMENTS

| | | |
|---|---|---|
| CN | 106528224 B | 8/2020 |

OTHER PUBLICATIONS

Anonymous, "A System and Method to Deliver Application in Docker Container with Layered Data-packed Volume Containers," An IP.com Prior Art Database Technical Disclosure, IPCOM000270385D, Jul. 1, 2022, 7 pages.

"Dinamic Build Docket Image," copyright 2022, GitHub, Inc., accessed Oct. 24, 22, 4 pages. https://github.com/marketplace/actions/dynamic-build-docker-image.

(Continued)

*Primary Examiner* — Jae U Jeon

(74) *Attorney, Agent, or Firm* — Yee & Associates, P.C.

(57) ABSTRACT

Managing container updates is provided. A changed file corresponding to a new version of an application is retrieved from a persistent volume based on a mapping between the new version of the application and the changed file. The changed file corresponding to the new version of the application is loaded in a corresponding file of a running container to update the corresponding file of the running container without redeploying the running container using an updated container image.

17 Claims, 7 Drawing Sheets

(56) References Cited

OTHER PUBLICATIONS

"docker container update," copyright 2013-2022, Docker Inc., accessed Oct. 24, 2022, 3 pages. https://docs.docker.com/engine/reference/commandline/container_update/.
"How to Update Docker Image and Container to the Latest Version," Aug. 13, 2020, copyright 2022, phoenixNAP, accessed Oct. 24, 2022, 7 pages. https://phoenixnap.com/kb/update-docker-image-container.
"Performing a Rolling Update," Kubernetes, Last modified Oct. 2, 2022, copyright 2022, The Linux Foundation, accessed Oct. 24, 2022, 2 pages. https://kubernetes.io/docs/tutorials/kubernetes-basics/update/update-intro/.
"Rolling update," Amazon Elastic Container Service, copyright 2022, Amazon Web Services, Inc., accessed Oct. 24, 2022, 5 pages. https://docs.aws.amazon.com/AmazonECS/latest/developerguide/deployment-type-ecs.html.
"Apply rolling updates to a service," Docket Documentation, accessed Oct. 24, 2022, 4 pages. https://docs.docker.com/engine/swarm/swarm-tutorial/rolling-update/.

* cited by examiner

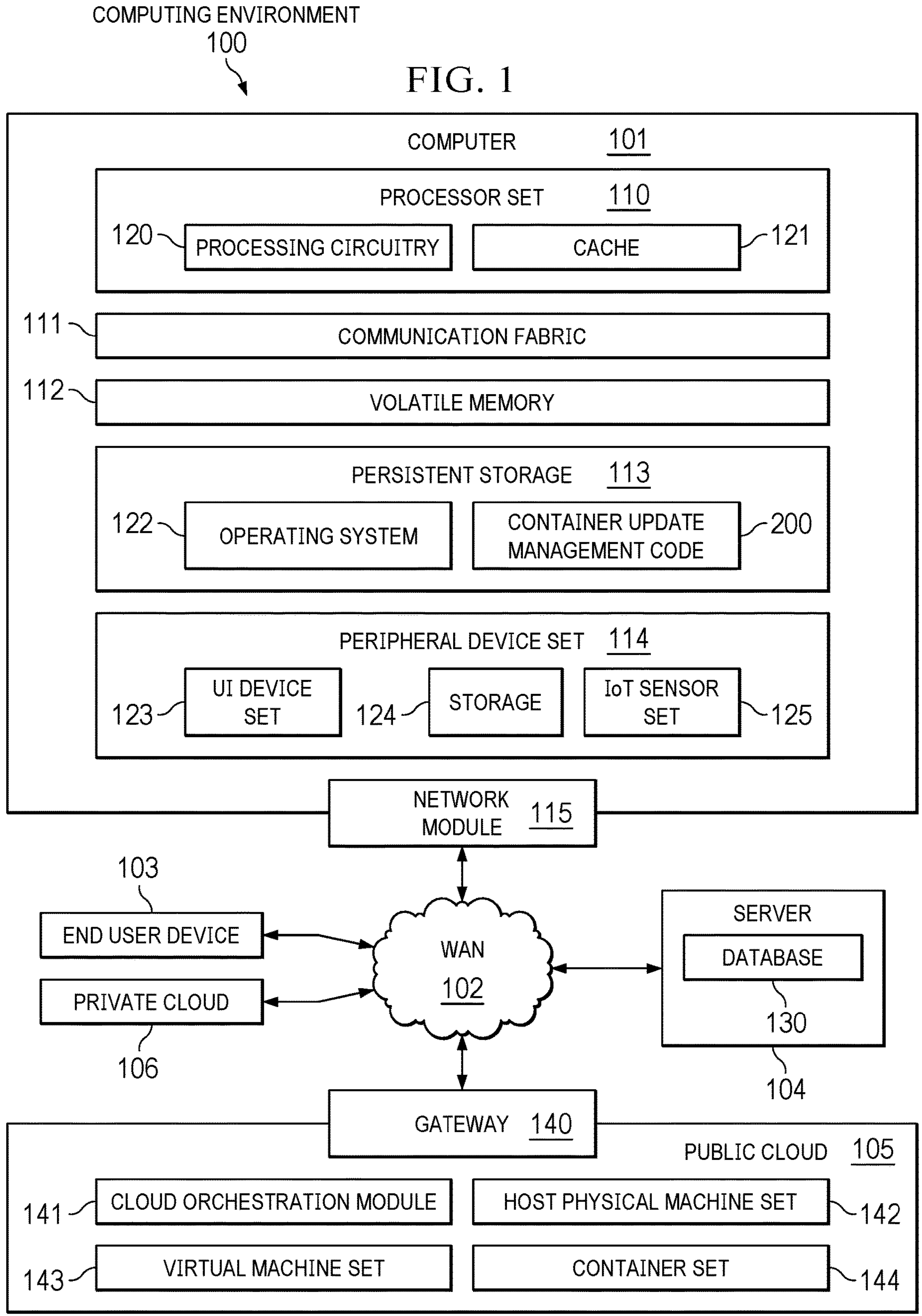
COMPUTING ENVIRONMENT
100
FIG. 1
COMPUTER 101
PROCESSOR SET 110
120
PROCESSING CIRCUITRY
CACHE
121
111
COMMUNICATION FABRIC
112
VOLATILE MEMORY
PERSISTENT STORAGE 113
122
OPERATING SYSTEM
CONTAINER UPDATE MANAGEMENT CODE
200
PERIPHERAL DEVICE SET 114
123
UI DEVICE SET
124
STORAGE
IoT SENSOR SET
125
NETWORK MODULE 115
103
END USER DEVICE
PRIVATE CLOUD
106
WAN
102
SERVER
DATABASE
130
104
GATEWAY 140
PUBLIC CLOUD 105
141
CLOUD ORCHESTRATION MODULE
HOST PHYSICAL MACHINE SET
142
143
VIRTUAL MACHINE SET
CONTAINER SET
144

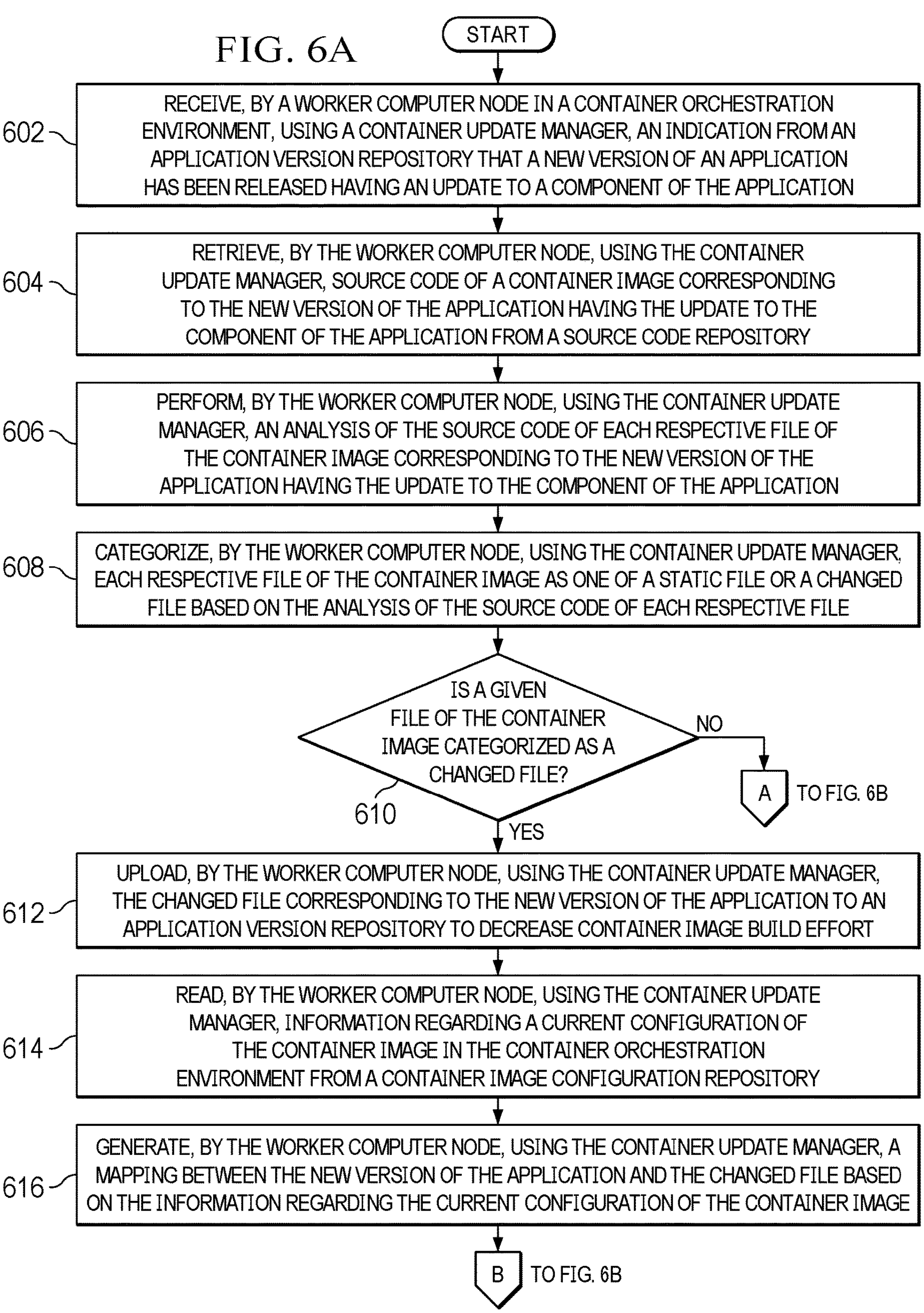
FIG. 6A
START
602
RECEIVE, BY A WORKER COMPUTER NODE IN A CONTAINER ORCHESTRATION ENVIRONMENT, USING A CONTAINER UPDATE MANAGER, AN INDICATION FROM AN APPLICATION VERSION REPOSITORY THAT A NEW VERSION OF AN APPLICATION HAS BEEN RELEASED HAVING AN UPDATE TO A COMPONENT OF THE APPLICATION
604
RETRIEVE, BY THE WORKER COMPUTER NODE, USING THE CONTAINER UPDATE MANAGER, SOURCE CODE OF A CONTAINER IMAGE CORRESPONDING TO THE NEW VERSION OF THE APPLICATION HAVING THE UPDATE TO THE COMPONENT OF THE APPLICATION FROM A SOURCE CODE REPOSITORY
606
PERFORM, BY THE WORKER COMPUTER NODE, USING THE CONTAINER UPDATE MANAGER, AN ANALYSIS OF THE SOURCE CODE OF EACH RESPECTIVE FILE OF THE CONTAINER IMAGE CORRESPONDING TO THE NEW VERSION OF THE APPLICATION HAVING THE UPDATE TO THE COMPONENT OF THE APPLICATION
608
CATEGORIZE, BY THE WORKER COMPUTER NODE, USING THE CONTAINER UPDATE MANAGER, EACH RESPECTIVE FILE OF THE CONTAINER IMAGE AS ONE OF A STATIC FILE OR A CHANGED FILE BASED ON THE ANALYSIS OF THE SOURCE CODE OF EACH RESPECTIVE FILE
IS A GIVEN FILE OF THE CONTAINER IMAGE CATEGORIZED AS A CHANGED FILE?
610
NO
A
TO FIG. 6B
YES
612
UPLOAD, BY THE WORKER COMPUTER NODE, USING THE CONTAINER UPDATE MANAGER, THE CHANGED FILE CORRESPONDING TO THE NEW VERSION OF THE APPLICATION TO AN APPLICATION VERSION REPOSITORY TO DECREASE CONTAINER IMAGE BUILD EFFORT
614
READ, BY THE WORKER COMPUTER NODE, USING THE CONTAINER UPDATE MANAGER, INFORMATION REGARDING A CURRENT CONFIGURATION OF THE CONTAINER IMAGE IN THE CONTAINER ORCHESTRATION ENVIRONMENT FROM A CONTAINER IMAGE CONFIGURATION REPOSITORY
616
GENERATE, BY THE WORKER COMPUTER NODE, USING THE CONTAINER UPDATE MANAGER, A MAPPING BETWEEN THE NEW VERSION OF THE APPLICATION AND THE CHANGED FILE BASED ON THE INFORMATION REGARDING THE CURRENT CONFIGURATION OF THE CONTAINER IMAGE
B
TO FIG. 6B

UPDATING RUNNING CONTAINERS WITHOUT REBUILDING CONTAINER IMAGES

BACKGROUND

1. Field

The disclosure relates generally to container orchestration environments and more specifically to automatically updating a file of a container currently running on a worker node of a container orchestration environment without rebuilding the container image corresponding to the running container.

2. Description of the Related Art

A container orchestration environment, such as, for example, Kubernetes® (a registered trademark of the Linux Foundation of San Francisco, California, USA), provides a platform for automating deployment, scaling, and operations of containers across clusters of worker nodes (also known as host nodes, compute nodes, minions, and the like). A worker node is a machine, either physical or virtual, where containers (i.e., application workloads) are deployed. A pod is a group of one or more containers, with shared storage and network resources, and a specification for how to run the containers. The worker node hosts the pods that are components of the application workloads.

A container image acts as a set of instructions to build a container. The container image is an executable software package that includes everything needed to run an application (e.g., application code, libraries, tools, dependencies, and other files, such as configuration files) in the container. In other words, the container image is used to execute application code in the container. When the container image is deployed in the container orchestration environment, the container image becomes an instance of the container within a pod of a worker node. The container is a virtual environment that bundles the application code with all the dependencies required to run the application.

The container image consists of several layers, each respective layer corresponds to a particular set of instructions in a file of the container. In a microservice architecture, multiple container images are typically needed for an application deployment. In addition, new application version releases are frequent in a container orchestration environment. Further, application updating frequency is high, such as, for example, once a month, once a week, once every several days, or even shorter. As a result, updating container images corresponding to these application changes can be a challenge.

For example, several application releases can run in parallel and building a set of container images for each application release would be a substantial endeavor. In addition, when a software update, patch, fix, or the like is applied to a component of an application (e.g., a library of the application), the container image corresponding to that particular component of the application needs to be changed as well. Further, multiple layers of the container image may need to change. A program developer needs to generate a new container image to update a particular layer. Moreover, waiting time for building the container image is increased when the container orchestration environment (e.g., the production environment) is being updated. Furthermore, it is difficult for a customer (e.g., an application library consumer) to stay up-to-date with the fast pace of the new application version releases.

One current solution provides a base container image that includes static files. The program developer can generate a container image, which corresponds to the new application version release, using the static files of the base container image. Another current solution has the container image request a particular file that is used to build the container image. That particular file is identified by a unique file identifier and retrieved from a storage location using a mapping table corresponding to the container image.

However, both of these current solutions inject files into containers at the container image build phase. In addition, these current solutions do not save the container image build effort. Further, container image update is still needed for the container to run the new version of the application. In other words, when the new application version is released, the program developer needs to update the container image via restarting the corresponding container to use the new container image. As a result, these current solutions increase the time needed to build and update container images, which increases the downtime of the services (e.g., microservices) provided by the new application version corresponding to those container images.

SUMMARY

According to one illustrative embodiment, a computer-implemented method for managing container updates is provided. A computer, using a container update manager, retrieves a changed file corresponding to a new version of an application from a persistent volume based on a mapping between the new version of the application and the changed file. The computer, using the container update manager, loads the changed file corresponding to the new version of the application in a corresponding file of a running container to update the corresponding file of the running container without redeploying the running container using an updated container image. According to other illustrative embodiments, a computer system and computer program product for managing container updates are provided.

As a result, the illustrative embodiments, by not redeploying the running container using an updated container image, the illustrative embodiments reduce or eliminate any downtime of the service (i.e., workload of the new version of the application) being performed by the running container which would otherwise be caused by updating the container image.

The illustrative embodiments also optionally receive an indication from an application version repository that the new version of the application has been released having an update to a component of the application and retrieve source code of a container image corresponding to the new version of the application having the update to the component of the application from a source code repository. An analysis of the source code of each respective file of the container image corresponding to the new version of the application having the update to the component of the application is performed and each respective file of the container image is categorized as one of a static file or a changed file based on the analysis of the source code of each respective file. It is determined whether a given file of the container image is categorized as a changed file and the changed file corresponding to the new version of the application is uploaded to an application version repository to decrease container image build effort in response to the computer determining that the given file of the container image is categorized as the changed file.

As a result, the illustrative embodiments decrease container image build effort for applications by storing changed files in the application version repository.

BRIEF DESCRIPTION OF THE DRAWINGS

FIG. 1 is a pictorial representation of a computing environment in which illustrative embodiments may be implemented;

FIGS. 6A-6B are a flowchart illustrating a process for updating running containers in accordance with an illustrative embodiment.

DETAILED DESCRIPTION

Figure 2:
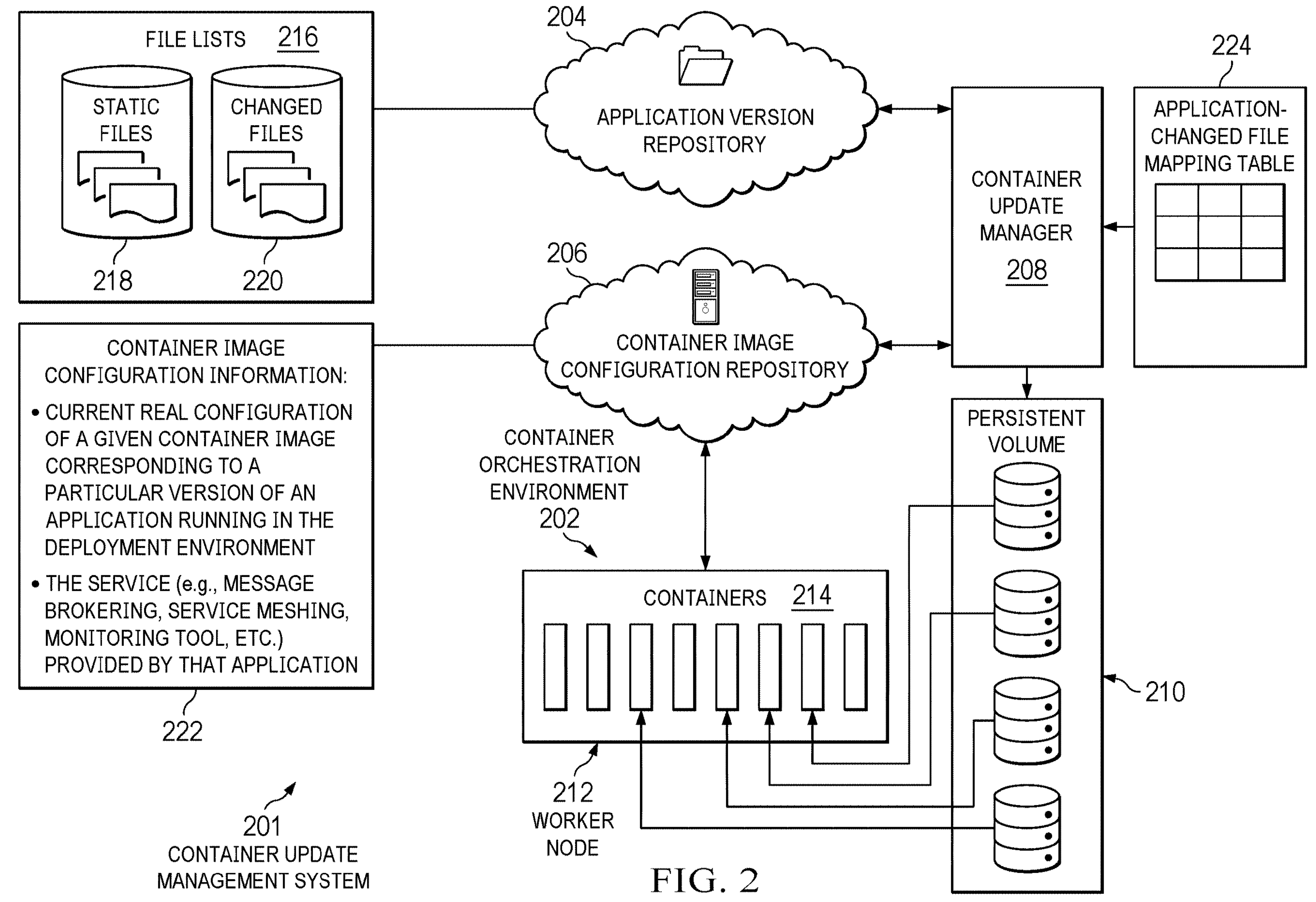
FIG. 2 is a diagram illustrating an example of a container update management system in accordance with an illustrative embodiment.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

With reference now to the figures, and in particular, with reference to FIGS. 1-4, diagrams of data processing environments are provided in which illustrative embodiments may be implemented. It should be appreciated that FIGS. 1-4 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods, such as container update management code 200. Container update management code 200 automatically updates files of running containers on worker nodes of a container orchestration environment without redeploying the running containers on the worker nodes using updated container images to reduce or eliminate any downtime of services provided by the running containers that would otherwise be caused by the updating of the container images corresponding to the running containers.

The container orchestration environment may be, for example, Kubernetes, which orchestrates containerized application workloads in a cloud architecture. However, it should be understood that Kubernetes is intended as an example environment only and not as a limitation on illustrative embodiments. In other words, illustrative embodiments may utilize any type of container orchestration environment, architecture, platform, or infrastructure that provides automated deployment, scaling, and operations of containers across worker nodes.

In addition to container update management code block 200, computing environment 100 includes, for example, computer 101, wide area network (WAN) 102, end user device (EUD) 103, server 104, public cloud 105, and private cloud 106. In this embodiment, computer 101 includes processor set 110 (including processing circuitry 120 and cache 121), communication fabric 111, volatile memory 112, persistent storage 113 (including operating system 122 and container update management code 200, as identified above), peripheral device set 114 (including user interface (UI) device set 123, storage 124, and Internet of Things (IoT) sensor set 125), and network module 115. Server 104 includes database 130. Public cloud 105 includes gateway 140, cloud orchestration module 141, host physical machine set 142, virtual machine set 143, and container set 144.

Computer 101 may take the form of a computer, mainframe computer, quantum computer, or any other form of computer now known or to be developed in the future that is capable of running a program, accessing a network, and querying a database, such as database 130. Computer 101 may be, for example, a worker computer node in the container orchestration environment. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in container update management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up busses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The container update management code included in block 200 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

End user device (EUD) 103 is any computer system that is used and controlled by an end user (e.g., a system administrator of an entity, such as an enterprise, company, business, organization, or the like that operates computer 101), and may take any of the forms discussed above in connection with computer 101. EUD 103 typically receives helpful and useful data from the operations of computer 101. For example, in a hypothetical case where computer 101 is designed to provide a container update recommendation to an end user, this recommendation would typically be communicated from network module 115 of computer 101 through WAN 102 to EUD 103. In this way, EUD 103 can display, or otherwise present, the container update recommendation to the end user. In some embodiments, EUD 103 may be a client device, such as thin client, heavy client, mainframe computer, desktop computer, and so on.

Server 104 is any computer system that serves at least some data and/or functionality to computer 101. For example, server 104 may be an application version control server that receives new versions of applications that have been released by program developers. Server 104 may be controlled and used by the same entity that operates computer 101. Server 104 represents the machine(s) that collect and store helpful and useful data for use by other computers, such as computer 101. For example, in a hypothetical case where computer 101 is designed and programmed to provide a container update recommendation based on historical container image changed file data, then this historical container image changed file data may be provided to computer 101 from database 130 of server 104. Database 130 may be, for example, an application version repository.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, an application running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

Illustrative embodiments dynamically update files in a running container without redeploying the container using an updated container image. Illustrative embodiments maintain an up-to-date changed file list (e.g., a list of files containing changes to container images corresponding to new application version releases having component updates) to ensure consistency and efficiency of updating files in currently running containers on worker nodes. Illustrative embodiments analyze the source code of files of a container image corresponding to a released new version of an application to identify whether a given file is one of a static file (e.g., a file that does not change release by release of the application) or a changed file (e.g., a file that changes release by release of the application).

Illustrative embodiments utilize a persistent volume (e.g., external storage device) to store a changed file. Illustrative embodiments store the changed file in a fixed folder corresponding to the container image in the persistent volume. Illustrative embodiments mount the fixed folder containing the changed file corresponding to the container image on the persistent volume when deploying the container image. Then, illustrative embodiments pass the changed file to the running container in the worker node to update a corresponding file in the running container without redeploying the container using an updated container image.

Illustrative embodiments utilize an application version control server to deliver the changes corresponding to a new application version release to an application version repository. The application version repository is a version control file system that stores application version information (e.g., different releases of each respective application running in the container orchestration environment), along with their corresponding changed files. Each time the program developer releases a new version of an application, illustrative embodiments upload the changed file of a container image corresponding to the new application version release to a container update manager.

Illustrative embodiments utilize a broadcasting mechanism to notify a user of the changes to the application. Illustrative embodiments utilize the container update manager to notify the user of the application changes. In one illustrative embodiment, the container update manager is located in the container that is to be updated in the worker node. In an alternative illustrative embodiment, the container update manager is located in another container of the worker node. The container update manager interacts with the application version repository to receive notification messages regarding application changes and retrieves the changed file corresponding to the application from the application version repository. The container update manager can also receive feedback from the user regarding whether a particular changed file is incorrectly categorized (e.g., not a changed file, but a static file). In addition, the user can provide user preference as to whether the user wants the container update manager to automatically update a file of the running container corresponding to the application or not. Further, the container update manager generates a mapping between the application and a changed file corresponding to a given released version of that particular application.

As a result, illustrative embodiments provide application component level updating for fine-grained version control. Moreover, illustrative embodiments decrease or eliminate downtime of services associated with redeployment of containers, which provide the services, using updated container images. In addition, illustrative embodiments decrease effort for building container images by storing the changed files in the application version repository. Further, illustrative embodiments provide easier application version control for users.

Thus, illustrative embodiments provide one or more technical solutions that overcome a technical problem with updating files of running containers in worker nodes of a container orchestration environment. As a result, these one or more technical solutions provide a technical effect and practical application in the field of container orchestration environments.

With reference now to FIG. 2, a diagram illustrating an example of a container update management system is depicted in accordance with an illustrative embodiment. Container update management system 201 may be implemented in a computing environment, such as computing environment 100 in FIG. 1. Container update management system 201 is a system of hardware and software components for automatically updating files of running containers on worker nodes of a container orchestration environment without redeploying the running containers on the worker nodes using updated container images to reduce or eliminate any downtime of services provided by the running containers that would otherwise be caused by updating the container images.

In this example, container update management system 201 includes container orchestration environment 202, application version repository 204, container image configuration repository 206, container update manager 208, persistent volume 210, and worker node 212. Container orchestration environment 202 may be, for example, computing environment 100 in FIG. 1. Container orchestration environment 202 includes worker node 212. Worker node 212 may be, for example, computer 101 in FIG. 1. Also, worker node 212 may represent a plurality of worker nodes in container orchestration environment 202. In addition, worker node 212 includes containers 214. It should be noted that container update manager 208 may be located in one of containers 214 or in each of containers 214. Container update manager 208 may be implemented in, for example, container update management code 200 in FIG. 1.

Application version repository 204 and container image configuration repository 206 may be located on the same server, such as, for example, server 104 in FIG. 1, or on different servers. Application version repository 204 stores information regarding each different version of each respective application running on containers 214 of container orchestration environment 202. In addition, application version repository 204 stores file lists 216. File lists 216 include static files 218 and changed files 220.

Container update manager 208 of illustrative embodiments categorizes each respective file of a container image corresponding to a particular version of an application as either a static file or a changed file. Container update manager 208 identifies the initial file category of a particular file based on performing an analysis of the application source code located in the container image corresponding to that particular version of the application having a change to a component of the application. It should be noted that container update manager 208 can switch the file category from static file to changed file or from changed file to static file based on user feedback regarding whether the initial file category of a particular file was correct or not.

Container image configuration repository 206 stores container image configuration information 222. Container image configuration information 222 includes information corresponding to each respective container image associated with a particular version of an application, which is stored in application version repository 204. For example, container image configuration repository 206 records the current real configuration of a given container image corresponding to a particular version of an application in the container orchestration environment, along with the service (e.g., message brokering, service meshing, sensor monitoring, or the like) provided by that particular application.

Container update manager 208 generates mappings between changed files 220 and corresponding versions of applications stored in application version repository 204 based on container image configuration information 222 stored in container image configuration repository 206. Container update manager 208 stores the generated mappings between changed files 220 and the corresponding versions of the applications in application-changed file mapping table 224.

Further, container update manager 208 stores changed files 220 in fixed folders of persistent volume 210. Persistent volume 210 can be located, for example, in an external storage device. Alternatively, persistent volume 210 can be located in worker node 212. Container update manager 208 mounts a fixed folder containing a particular changed file corresponding to a particular container image on persistent volume 210 based on the information contained in application-changed file mapping table 224 when deploying that particular container image on worker node 212. Then, container update manager 208 passes that particular changed file to a corresponding running container in worker node 212 to update a corresponding file in the running container without redeploying the running container using an updated container image.

Figure 3:
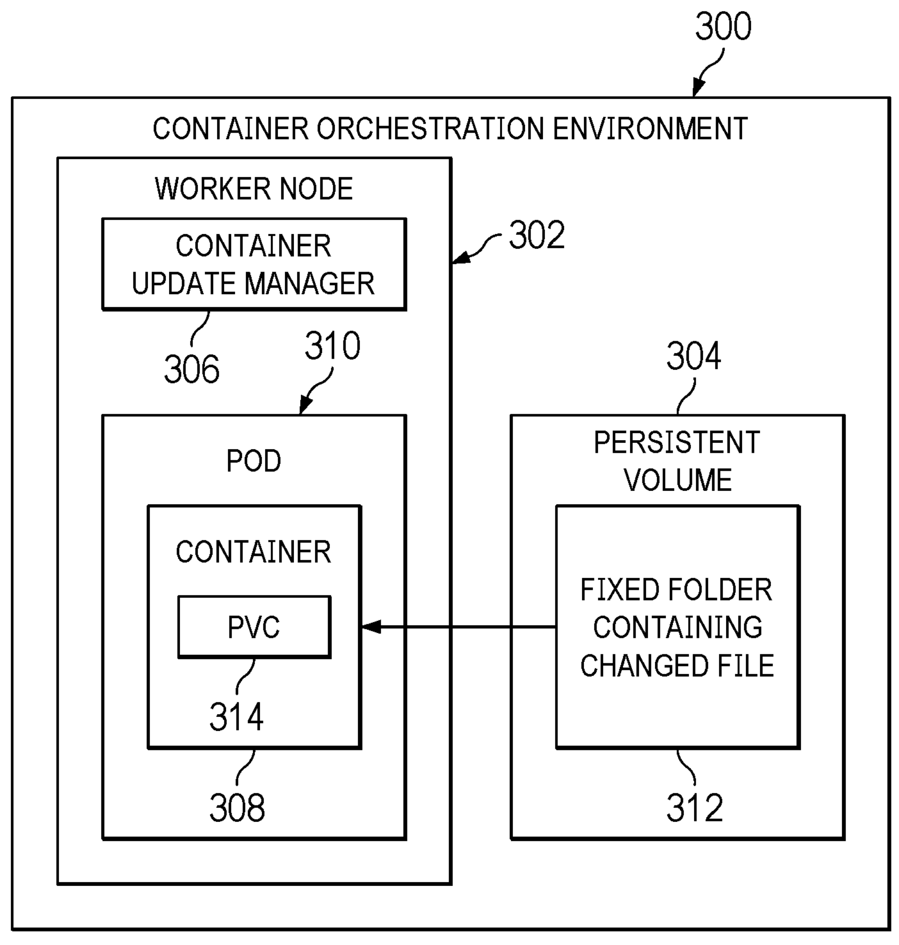
FIG. 3 is a diagram illustrating an example of a container orchestration environment in accordance with an illustrative embodiment.

With reference now to FIG. 3, a diagram illustrating an example of a container orchestration environment is depicted in accordance with an illustrative embodiment. Container orchestration environment 300 may be, for example, container orchestration environment 202 in FIG. 2.

In this example, container orchestration environment 300 includes worker node 302 and persistent volume 304, such as, for example, worker node 212 and persistent volume 210 in FIG. 2. However, it should be noted that container orchestration environment 300 is intended as an example only and not as a limitation on illustrative embodiments. In other words, container orchestration environment 300 can include any number of worker nodes and persistent volumes.

Worker node 302 includes container update manager 306, such as, for example, container update manager 208 in FIG. 2. It should be noted that container update manager 306 can be located in container 308 of pod 310. Alternatively, container update manager 306 can be located in a different container of worker node 302. Also, it should be noted that container 308 is currently running on worker node 302.

Container update manager 306 stores a changed file of a new version of an application in a fixed folder of persistent volume 304 as fixed folder containing changed file 314. Container update manager 306 copies the changed file to the fixed folder in persistent volume 304 when building the container image. When launching the container image, container update manager 306 mounts fixed folder containing changed file 312 on persistent volume 304. For example, when container update manager 306 deploys the container image on worker node 302, container 308 includes persistent volume claim (PVC) 314 for mounting fixed folder containing changed file 312 on persistent volume 304. Container update manager 306 then passes the changed file to container 308 to update a corresponding file in container 308 while container 308 is running on worker node 302 without rebuilding the container image corresponding to container 308.

Figure 4:
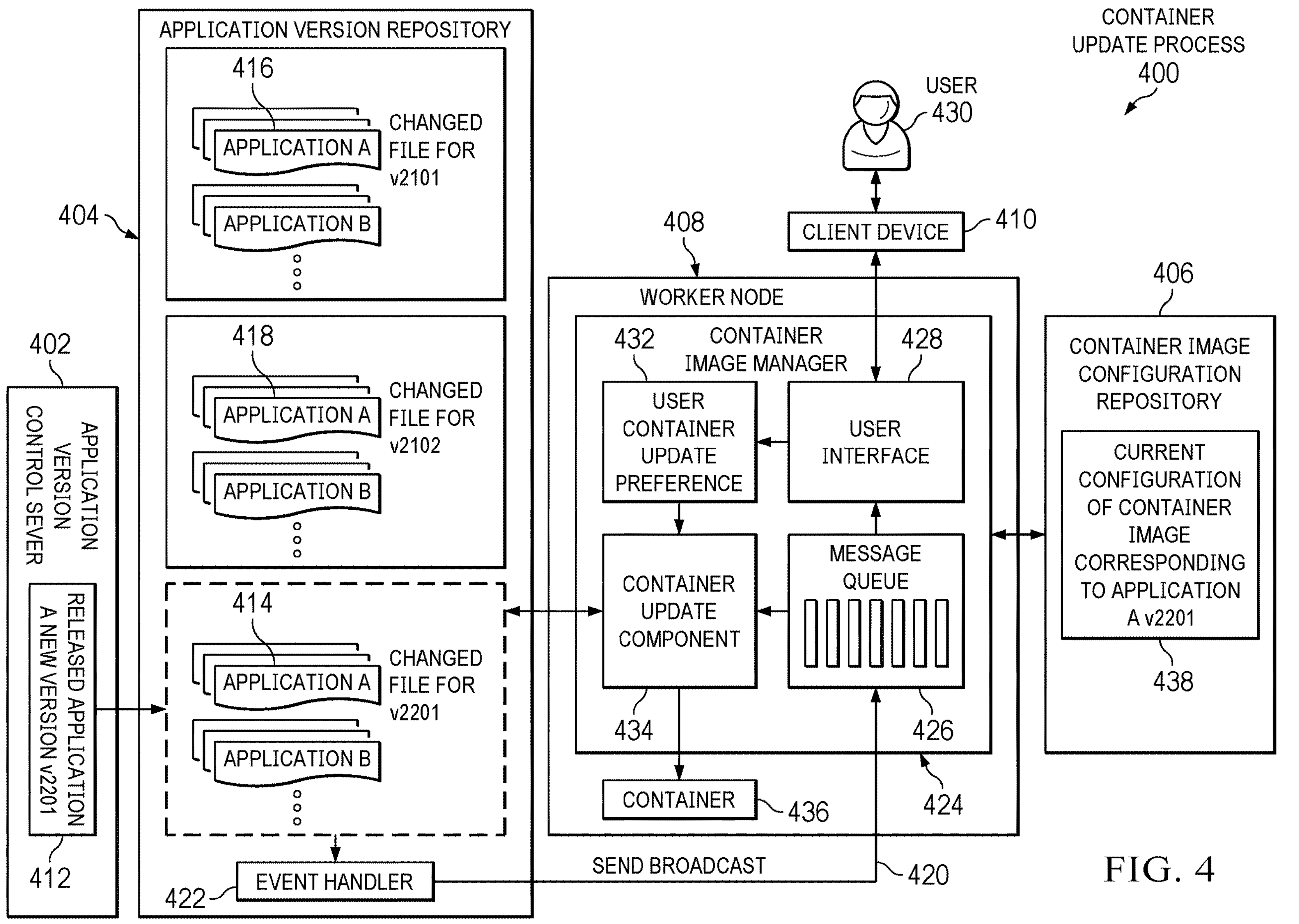
FIG. 4 is a diagram illustrating an example of a container update process in accordance with an illustrative embodiment.

With reference now to FIG. 4, a diagram illustrating an example of a container update process is depicted in accordance with an illustrative embodiment. Container update process 400 may be implemented in, for example, computing environment 100 in FIG. 1 or container update management system 201 in FIG. 2.

In this example, container update process 400 includes application version control server 402, application version repository 404, container image configuration repository 406, worker node 408, and client device 410. Application version control server 402 and client device 410 may be, for example, server 104 and EUD 103, respectively, in FIG. 1. Application version repository 404, container image configuration repository 406, and worker node 408 may be, for example, application version repository 204, container image configuration repository 206, and worker node 212 in FIG. 2. Also, application version repository 404 and container image configuration repository 406 can be located on application version control server 402. Alternatively, application version repository 404 can be located on application version control server 402 and container image configuration repository 406 can be located on a separate server.

At 412, application version control server 402 receives released Application A new version v2201 from a program developer. Application version control server 402 stores new version v2201 of released Application A in application version repository 404, along with changed file 414 for v2201 of released Application A. Changed file 414 for v2201 of released Application A represents a container image file corresponding to a change (e.g., update, patch, fix, or the like) to a component of Application A. Application version repository 404 also stores changed file 416 for v2101 of Application A and changed file for v2102 of Application A. However, it should be noted that application version repository 404 stores all the versions of the different applications running on worker nodes of the container orchestration environment, along with the changed files corresponding to the container images associated with each of the different application versions and each respective component change.

Thus, each time a program developer releases a new version of an application, application version control server 402 uploads the new version of the application and corresponding changed file to application version repository 404. At 420, upon receiving changed file 414 for v2201 of Application A, application version repository 404, using event handler 422, sends a broadcast (e.g., a notification message) regarding changed file 414, which corresponds to newly released v2201 of Application A, to container update manager 424 of worker node 408. Container update manager 424 may be, for example, container update manager 208 in FIG. 2 or container update manager 306 in FIG. 3.

Container update manager 424 utilizes message queue 426 to receive the broadcast regarding changed file 414 corresponding to newly released v2201 of Application A. Container update manager 424 utilizes user interface 428 to display the broadcast of the notification message regarding changed file 414, which corresponds to newly released v2201 of Application A, to user 430 via client device 410. User 430 may be, for example, a system administrator.

In addition, container update manager 424 can receive user container update preference 432 from user 430 via user interface 428. User container update preference 432 can be set to allow container update manager 424, utilizing container update component 434, to automatically update a file, which corresponding to changed file 414, in container 436. Container 436 is a currently running container that is provide a service corresponding to Application A on worker node 408. Container update component 434 automatically updates the corresponding file in container 436 using changed file 414, which container update component 434 retrieved from a fixed folder in a persistent volume, such as, for example, fixed folder containing changed file 312 of persistent volume 304 in FIG. 3, without redeploying container 436 using an updated container image. Alternatively, user container update preference 432 can be set to prevent container update manager 424 from automatically updating container 436 until enabled by user 430 to do so. Further, at 438, container update manager 424 updates container image configuration repository 406 regarding a current configuration of the container image corresponding to the component change in Application A v2201.

Figure 5:
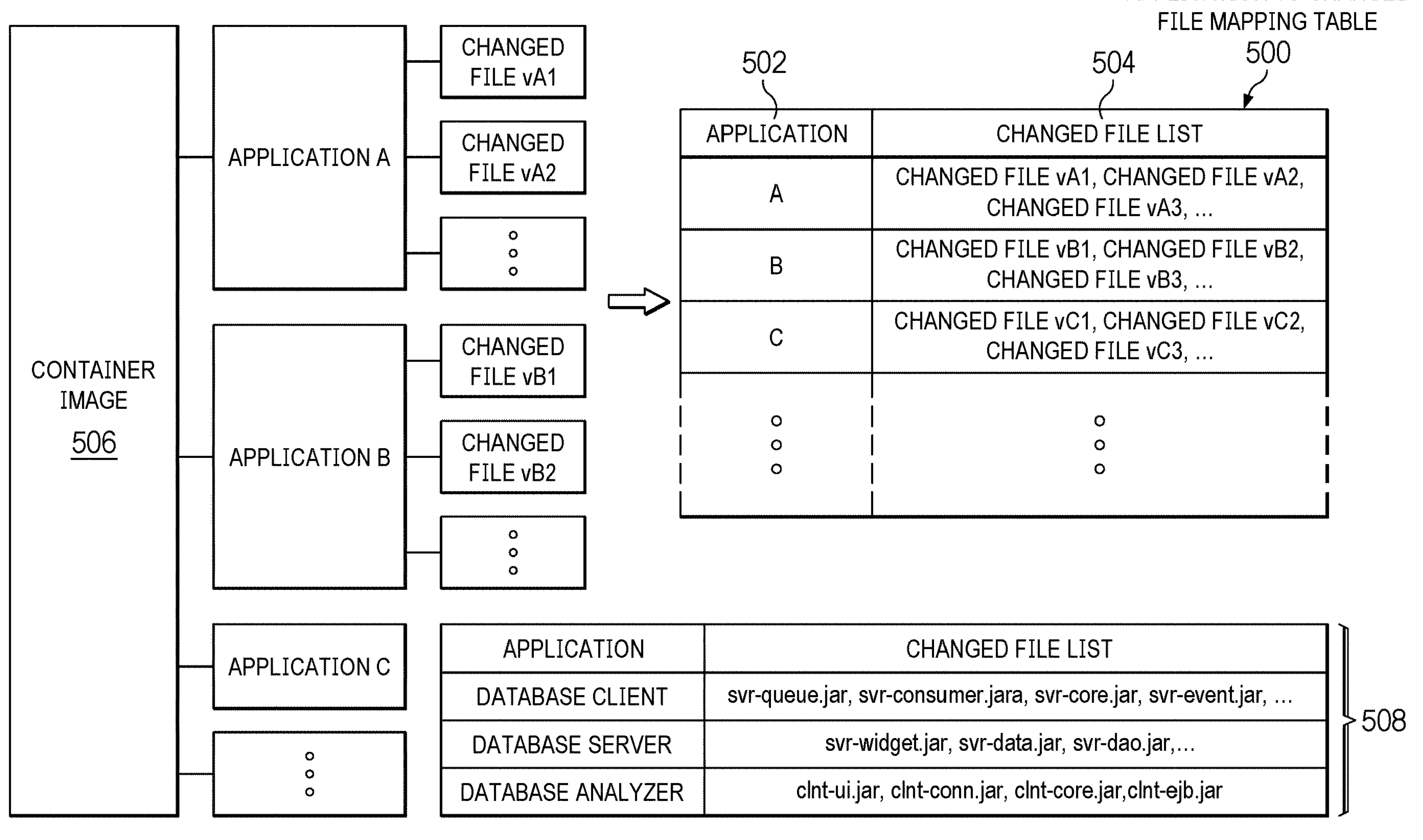
FIG. 5 is a diagram illustrating an example of an application to changed file mapping table in accordance with an illustrative embodiment.

With reference now to FIG. 5, a diagram illustrating an example of an application to changed file mapping table is depicted in accordance with an illustrative embodiment. Application to changed file mapping table 500 may be, for example, application-changed file mapping table 224 in FIG. 2, and can be implemented in a container update manager, such as, for example, container update manager 208 in FIG. 2.

In this example, application to changed file mapping table 500 includes application 502 and changed file list 504. Application 502 identifies each respective application, such as, for example, Application A, Application B, Application C, and so on, running on worker nodes in the container orchestration environment. Changed file list 504 identifies each respective changed file corresponding to a different version (e.g., vA1, vA2, vA3, vB1, vB2, vB3, vC1, vC2, vC3, and so on) of each respective application identified in the column corresponding to application 502. Container image 506 represents container images corresponding to the different applications. 508 represents a specific illustrative example of applications with their corresponding changed files (e.g., DB Client application with corresponding changed files for different versions such as svr-queue.jar, svr-consumer.jara, sver-core.jar, sver-event.jar, . . . ; DB Server application with corresponding changed files for different versions such as svr-widget.jar, svr-data.jar, sver-doa.jar . . . . ; and DB Analyzer application with corresponding changed files for different versions such as clnt-ui.jar, clnt-conn.jar, clnt-core.jar, clnt-ejb.jar, . . . ).

Figure 6B:
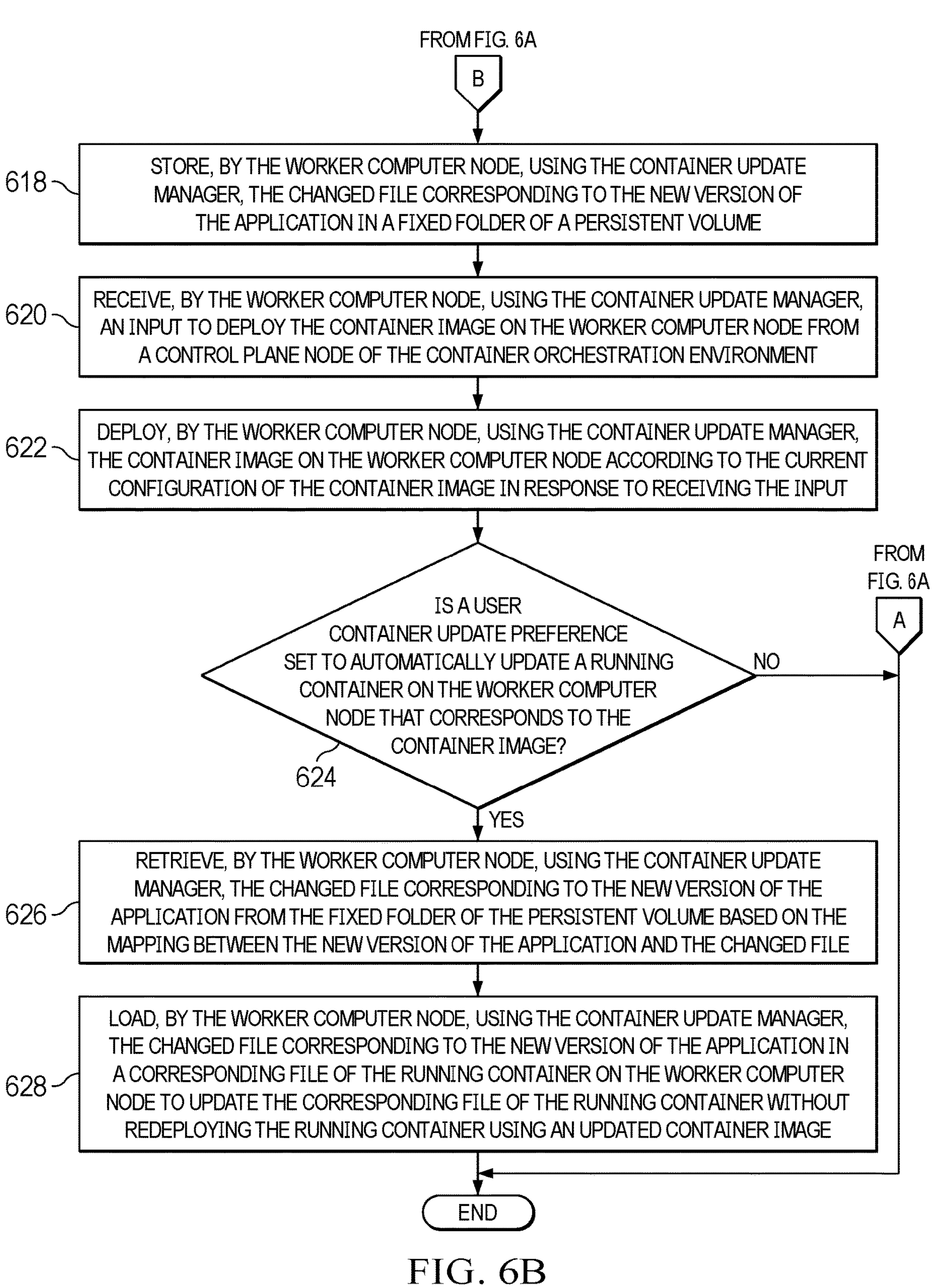

With reference now to FIGS. 6A-6B, a flowchart illustrating a process for updating running containers is shown in accordance with an illustrative embodiment. The process shown in FIGS. 6A-6B may be implemented in a worker computer node, such as, for example, computer 101 in FIG. 1, worker node 212 in FIG. 2, worker node 302 in FIG. 3, or worker node 408 in FIG. 4. For example, the process shown in FIGS. 6A-6B may be implemented in container update management code 200 in FIG. 1, container update manager 208 in FIG. 2, container update manager 306 in FIG. 3, or container update manager 424 in FIG. 4.

The process begins when the worker computer node, using a container update manager, receives an indication from an application version repository that a new version of an application has been released having an update to a component of the application (step 602). The worker computer node is located in a container orchestration environment. The container orchestration environment is included in a cloud architecture. In response to receiving the indication from the application version repository that the new version of the application has been released, the worker computer node, using the container update manager, retrieves source code of a container image corresponding to the new version of the application having the update to the component of the application from a source code repository (step 604).

The worker computer node, using the container update manager, performs an analysis of the source code of each respective file of the container image corresponding to the new version of the application having the update to the component of the application (step 606). The worker computer node, using the container update manager, categorizes each respective file of the container image as one of a static file or a changed file based on the analysis of the source code of each respective file (step 608).

Afterward, the worker computer node, using the container update manager, makes a determination as to whether a given file of the container image is categorized as a changed file (step 610). If the worker computer node, using the container update manager, determines that no file of the container image is categorized as a changed file, no output of step 610, then the process terminates thereafter. If the worker computer node, using the container update manager, determines that a given file of the container image is categorized as a changed file, no output of step 610, then the worker computer node, using the container update manager, uploads the changed file corresponding to the new version of the application to an application version repository to decrease container image build effort (step 612).

In addition, the worker computer node, using the container update manager, reads information regarding a current configuration of the container image in the container orchestration environment from a container image configuration repository (step 614). The worker computer node, using the container update manager, generates a mapping between the new version of the application and the changed file based on the information regarding the current configuration of the container image (step 616). Further, the worker computer node, using the container update manager, stores the changed file corresponding to the new version of the application in a fixed folder of a persistent volume (step 618). The persistent volume is located in an external storage device.

Subsequently, the worker computer node, using the container update manager, receives an input to deploy the container image on the worker computer node from a control plane node of the container orchestration environment (step 620). The worker computer node, using the container update manager, deploys the container image on the worker computer node according to the current configuration of the container image in response to receiving the input (step 622).

Afterward, the worker computer node, using the container update manager, makes a determination as to whether a user container update preference is set to automatically update a running container on the worker computer node that corresponds to the container image (step 624). If the worker computer node, using the container update manager, determines that the user container update preference is not set to automatically update the running container on the worker computer node that corresponds to the container image, no output of step 624, then the process terminates thereafter. If the worker computer node, using the container update manager, determines that the user container update preference is set to automatically update the running container on the worker computer node that corresponds to the container image, yes output of step 624, then the worker computer node, using the container update manager, retrieves the changed file corresponding to the new version of the application from the fixed folder of the persistent volume based on the mapping between the new version of the application and the changed file (step 626). The worker computer node, using the container update manager, loads the changed file corresponding to the new version of the application in a corresponding file of the running container to update the corresponding file of the running container without redeploying the running container using an updated container image (step 628). By not redeploying the running container using an updated container image, the worker computer node, using the container update manager of illustrative embodiments, reduces or eliminates any downtime of the service (i.e., workload of the new version of the application) being performed by the running container which would otherwise be caused by updating the container image. Thereafter, the process terminates.

Thus, illustrative embodiments of the present invention provide a computer-implemented method, computer system, and computer program product for automatically updating a file of a container currently running on a worker node of a container orchestration environment without rebuilding the container image corresponding to the running container. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing container updates, the computer-implemented method comprising:

performing, by a computer, using a container update manager, an analysis of source code of each respective file of a container image corresponding to a new version of an application having an update to a component of the application;

categorizing, by the computer, using the container update manager, each respective file of the container image as one of a static file or a changed file based on the analysis of the source code of each respective file;

retrieving, by the computer, using the container update manager, the changed file corresponding to the new version of the application from a persistent volume based on a mapping between the new version of the application and the changed file; and loading, by the computer, using the container update manager, the changed file corresponding to the new version of the application in a corresponding file of a running container to update the corresponding file of the running container without redeploying the running container using an updated container image.

2. The computer-implemented method of claim 1 further comprising:

receiving, by the computer, using the container update manager, an indication from an application version repository that the new version of the application has been released having the update to the component of the application; and retrieving, by the computer, using the container update manager, the source code of the container image corresponding to the new version of the application having the update to the component of the application from a source code repository.

3. The computer-implemented method of claim 1 further comprising:

determining, by the computer, using the container update manager, whether a given file of the container image is categorized as the changed file; and uploading, by the computer, using the container update manager, the changed file corresponding to the new version of the application to an application version repository to decrease container image build effort in response to the computer determining that the given file of the container image is categorized as the changed file.

4. The computer-implemented method of claim 3 further comprising:

reading, by the computer, using the container update manager, information regarding a current configuration of the container image from a container image configuration repository; and generating, by the computer, using the container update manager, the mapping between the new version of the application and the changed file based on the information regarding the current configuration of the container image.

5. The computer-implemented method of claim 4 further comprising:

storing, by the computer, using the container update manager, the changed file in a fixed folder corresponding to the new version of the application in the persistent volume;

receiving, by the computer, using the container update manager, an input to deploy the container image; and deploying, by the computer, using the container update manager, the container image on the computer according to the current configuration of the container image in response to receiving the input.

6. The computer-implemented method of claim 1, wherein the container update manager is located in another container of the computer rather than the running container that is performing a service corresponding to the application.

7. The computer-implemented method of claim 1, wherein the running container is located in the computer.

8. The computer-implemented method of claim 1, wherein the persistent volume is located in an external storage device.

9. The computer-implemented method of claim 1, wherein the computer is a worker computer node of a container orchestration environment corresponding to a cloud architecture.

10. A computer system for managing container updates, the computer system comprising:

a communication fabric;

a storage device connected to the communication fabric, wherein the storage device stores program instructions; and a processor connected to the communication fabric, wherein the processor executes the program instructions to:

perform, using a container update manager, an analysis of source code of each respective file of a container image corresponding to a new version of an application having an update to a component of the application;

categorize, using the container update manager, each respective file of the container image as one of a static file or a changed file based on the analysis of the source code of each respective file;

retrieve, using the container update manager, the changed file corresponding to the new version of the application from a persistent volume based on a mapping between the new version of the application and the changed file; and load, using the container update manager, the changed file corresponding to the new version of the application in a corresponding file of a running container to update the corresponding file of the running container without redeploying the running container using an updated container image.

11. The computer system of claim 10, wherein the processor further executes the program instructions to:

receive, using the container update manager, an indication from an application version repository that the new version of the application has been released having the update to the component of the application; and retrieve, using the container update manager, the source code of the container image corresponding to the new version of the application having the update to the component of the application from a source code repository.

12. The computer system of claim 10, wherein the processor further executes the program instructions to:

determine, using the container update manager, whether a given file of the container image is categorized as the changed file; and upload, using the container update manager, the changed file corresponding to the new version of the application to an application version repository to decrease container image build effort in response to determining that the given file of the container image is categorized as the changed file.

13. A computer program product for managing container updates, the computer program product comprising a computer-readable storage medium having program instructions embodied therewith, the program instructions executable by a computer to cause the computer to perform a method of:

performing, by the computer, using a container update manager, an analysis of source code of each respective file of a container image corresponding to a new version of an application having an update to a component of the application;

categorizing, by the computer, using the container update manager, each respective file of the container image as one of a static file or a changed file based on the analysis of the source code of each respective file;

retrieving, by the computer, using the container update manager, the changed file corresponding to the new version of the application from a persistent volume based on a mapping between the new version of the application and the changed file; and loading, by the computer, using the container update manager, the changed file corresponding to the new version of the application in a corresponding file of a running container to update the corresponding file of the running container without redeploying the running container using an updated container image.

14. The computer program product of claim 13 further comprising:

receiving, by the computer, using the container update manager, an indication from an application version repository that the new version of the application has been released having the update to the component of the application; and retrieving, by the computer, using the container update manager, the source code of the container image corresponding to the new version of the application having the update to the component of the application from a source code repository.

15. The computer program product of claim 13 further comprising:

determining, by the computer, using the container update manager, whether a given file of the container image is categorized as the changed file; and uploading, by the computer, using the container update manager, the changed file corresponding to the new version of the application to an application version repository to decrease container image build effort in response to the computer determining that the given file of the container image is categorized as the changed file.

16. The computer program product of claim 15 further comprising:

reading, by the computer, using the container update manager, information regarding a current configuration of the container image from a container image configuration repository; and generating, by the computer, using the container update manager, the mapping between the new version of the application and the changed file based on the information regarding the current configuration of the container image.

17. The computer program product of claim 16 further comprising:

storing, by the computer, using the container update manager, the changed file in a fixed folder corresponding to the new version of the application in the persistent volume;

receiving, by the computer, using the container update manager, an input to deploy the container image; and deploying, by the computer, using the container update manager, the container image on the computer according to the current configuration of the container image in response to receiving the input.

* * * * *